United States Patent
Chakra et al.

(10) Patent No.: US 9,251,125 B2
(45) Date of Patent: Feb. 2, 2016

(54) MANAGING TEXT IN DOCUMENTS BASED ON A LOG OF RESEARCH CORRESPONDING TO THE TEXT

(71) Applicant: International Business Machines Corporation, Armonk, NY (US)

(72) Inventors: Al Chakra, Apex, NC (US); Liam Harpur, Dublin (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 13/837,980

(22) Filed: Mar. 15, 2013

(65) Prior Publication Data

US 2014/0280006 A1 Sep. 18, 2014

(51) Int. Cl.
*G06F 17/30* (2006.01)
*G06F 17/22* (2006.01)

(52) U.S. Cl.
CPC ........ *G06F 17/2211* (2013.01); *G06F 17/3005* (2013.01); *G06F 17/30011* (2013.01); *G06F 17/30017* (2013.01); *G06F 17/30023* (2013.01); *G06F 17/30864* (2013.01); *Y10S 707/913* (2013.01); *Y10S 707/917* (2013.01); *Y10S 707/99933* (2013.01)

(58) Field of Classification Search
CPC .................... G06F 17/30864; G06F 17/30011; G06F 17/30017; G06F 17/30023; G06F 17/3005; Y10S 707/913; Y10S 707/917; Y10S 707/99933

See application file for complete search history.

(56) References Cited

U.S. PATENT DOCUMENTS

| | | | |
|---|---|---|---|
| 5,502,637 A * | 3/1996 | Beaulieu ................. | G06Q 40/04 705/36 R |
| 6,928,432 B2 * | 8/2005 | Fagan ................ | G06F 17/30722 707/711 |
| 7,111,237 B2 | 9/2006 | Chan | |
| 7,260,774 B2 | 8/2007 | Lambert et al. | |
| 8,200,597 B2 * | 6/2012 | Wang et al. ..................... | 706/45 |
| 8,442,969 B2 * | 5/2013 | Gross ............................ | 707/709 |
| 2002/0038350 A1 | 3/2002 | Lambert et al. | |
| 2009/0292677 A1 | 11/2009 | Kim | |

* cited by examiner

*Primary Examiner* — Cheryl Lewis
(74) *Attorney, Agent, or Firm* — Yee & Associates, P.C.; David B. Woycechowsky

(57) ABSTRACT

A method and apparatus for managing text is disclosed. A data processing system identifies a log of research and text in a document that matches the log of research. The data processing system determines whether a mismatch exists between a search result for the text in the document and the log of research. Responsive to determining the mismatch exists between the search result for the text and the log of research, the data processing system then modifies the text in the document based on the log of research.

26 Claims, 7 Drawing Sheets

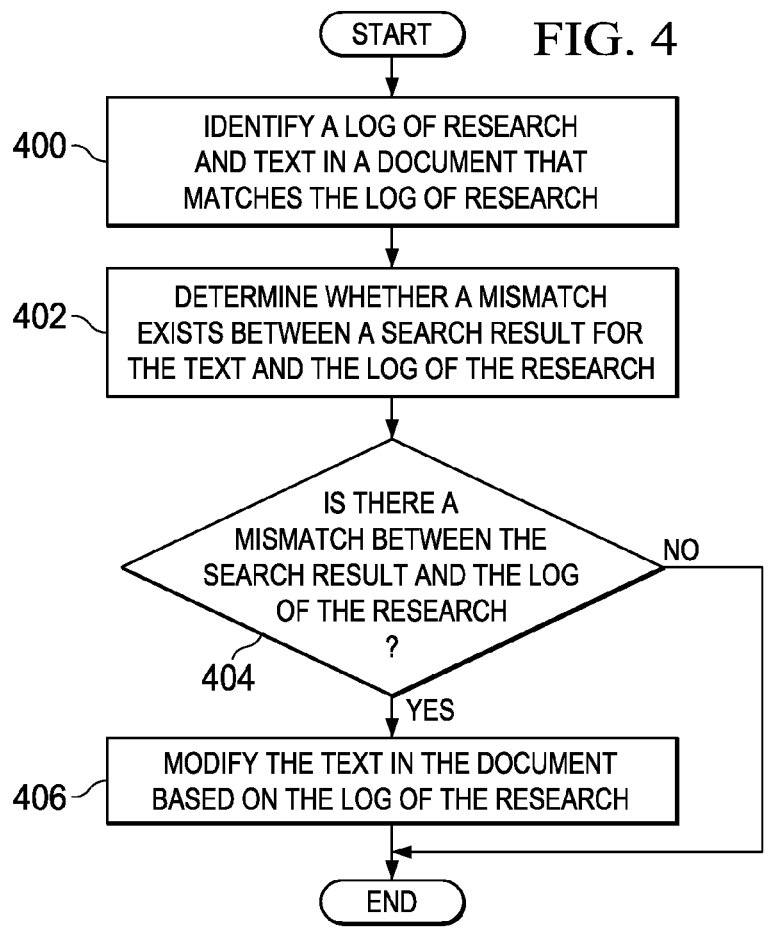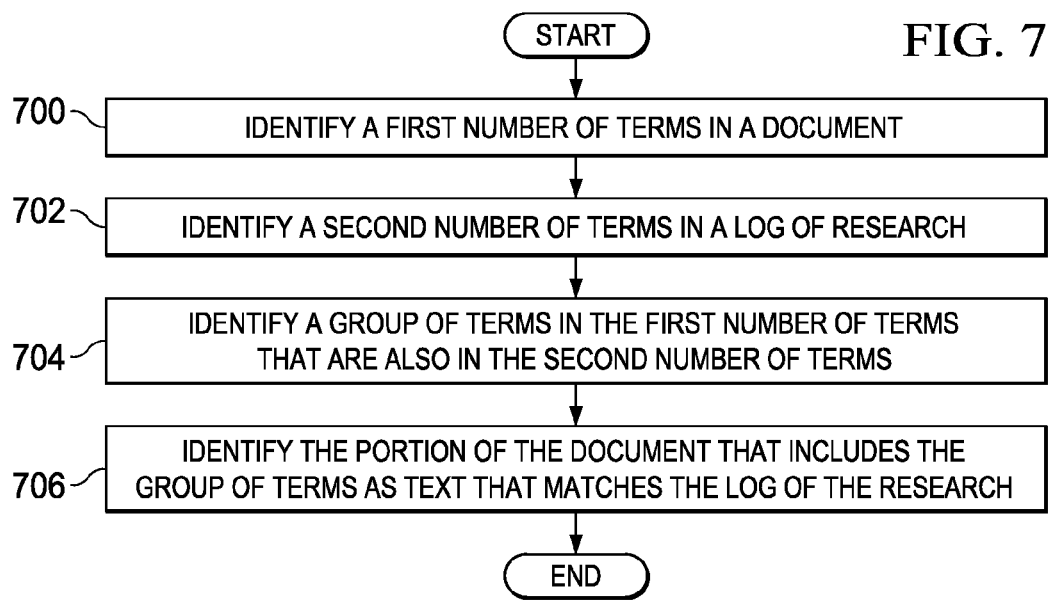

MANAGING TEXT IN DOCUMENTS BASED ON A LOG OF RESEARCH CORRESPONDING TO THE TEXT

BACKGROUND

1. Field

The disclosure relates generally to data processing systems and, in particular, to managing text. Still more particularly, the present disclosure relates to a method, apparatus, and computer program for modifying text in a document to correct a search result for the text.

2. Description of the Related Art

When writing a document, users enter information about topics into the document. The information entered by the users may be information learned while researching the topics. For example, information entered into the document for a particular topic may be information from a web page that includes information about the particular topic. In this example, when a reference to the web page is not provided in the document, the link between the particular topic in the document and the web page may not be known to some users of the document.

When reading about topics in a document, users oftentimes have a desire to search for additional information about the topics. For example, a user may use text in the document about a particular topic to form a search request for a search engine for the particular topic. When using a search engine, the text used in each search request determines each search result. A search request that has the wrong or insufficient text may result in some number of web pages in the search result that do not apply to the particular topic in the document.

Therefore, it would be desirable to have a method, apparatus, and computer program product that takes into account at least some of the issues discussed above.

SUMMARY

In one illustrative embodiment, a method, apparatus, and computer program product for managing text is disclosed. An apparatus identifies a log of research and text in a document that matches the log of research. The apparatus determines whether a mismatch exists between a search result for the text in the document and the log of research. Responsive to determining the mismatch exists between the search result for the text and the log of research, the apparatus then modifies the text in the document based on the log of research.

BRIEF DESCRIPTION OF THE SEVERAL VIEWS OF THE DRAWINGS

FIG. 4 is a flow chart of a process for managing text in a document based on a log of research matching the text in the document in accordance with an illustrative embodiment;

FIG. 7 is a flow chart of a process for identifying text in a document matching a log of research based on a group of terms located in both the document and the log of the research in accordance with an illustrative embodiment.

DETAILED DESCRIPTION

Figure 1:
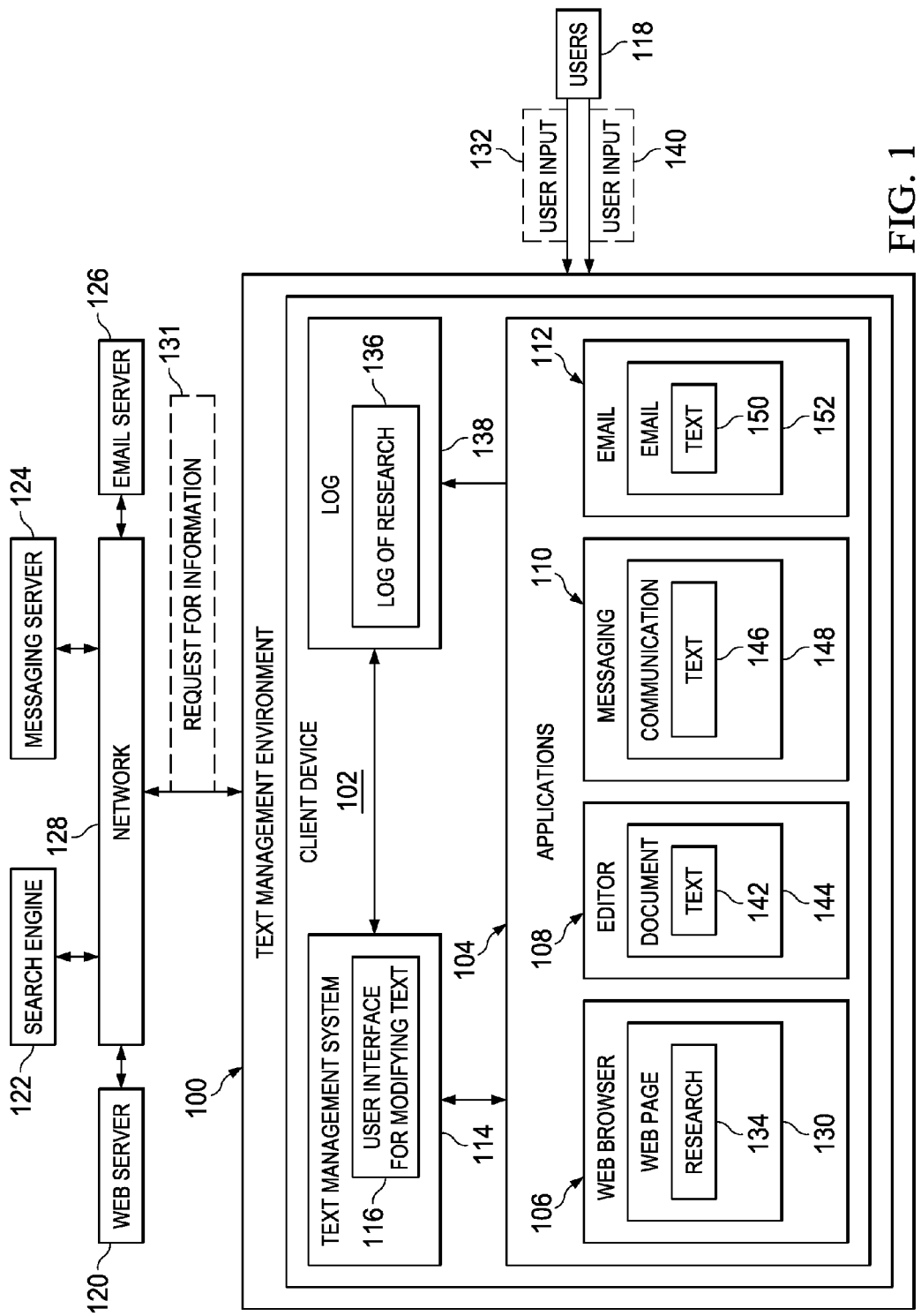
FIG. 1 is an illustration of a data processing environment for managing text in documents in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The illustrative embodiments recognize and take into account that existing web servers are available for use by users of web sites. These web servers communicate with web browsers by generating web pages and sending the web pages to a web browser. The generated web pages are typically displayed on a display screen by a web browser running on a computing device. For example, a server of a search engine web site may generate a web page comprising search results responsive to receiving a search request from a user. In this example, the user that made the search request may use the computing device to select a reference in the search results generated by the search engine. As another example, an email server may be used by users to exchange emails with other users. As also used herein, the term "computing device" means a hardware device with a processor unit and a capability to display information on a display device and may also include the capability to emit audio on a speaker. For example, the computing device may be a computer, a television with a processor unit, a smart phone, and any other suitable device.

Thus, the illustrative embodiments provide a method, apparatus, and computer program product for managing text. For example, the different illustrative embodiments may use a process in a text management system for managing text of documents. For example, the text management system may identify a log of research and text in a document that matches the log of research. The text management system determines whether a mismatch exists between a search result for the text in the document and the log of research. Responsive to determining the mismatch exists between the search result for the text in the document and the log of research, the text management system then modifies the text in the document based on the log of research. The text management system may also add a copy of the log of research to the document. The text management system may further add to the document a reference from the text in the document to one or both of the copy of the log of research in the document and the log of research.

With reference now to the figures and, in particular, with reference to FIG. 1, an illustration of a text management environment for managing text in documents is depicted in accordance with an illustrative embodiment. In this illustrative example, text management environment 100 is depicted in block diagram form.

Applications 104 run on client device 102 within text management environment 100. Applications 104 may take various forms. For example, applications 104 may include web browser 106, editor 108, messaging 110, email 112, and other suitable types of applications in text management environment 100. For example, applications 104 also may include at least one of a text management application, a database application, a smart-phone application, and an audio based web browser. In these illustrative examples, applications 104 in client device 102 display information on a display screen. Applications 104 in client device 102 may also present information by using a speaker to emit audio.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, text management system 114 presents user interface for modifying text 116 to users 118 of client device 102. In these illustrative examples, user interface for modifying text 116 may be displayed in applications 104 in client device 102, in a process in text management system 114 for modifying text. Applications 104 in client device 102 communicate with text management system 114 in client device 102. In the different illustrative examples, text management system 114 and applications 104 in client device 102 may communicate with web server 120, search engine 122, messaging server 124, and email server 126 over network 128.

In these illustrative examples, web server 120 provides web pages in response to requests from users 118. For example, web page 130 may be provided by web server 120 to client device 102 in response to receiving request for information 131 sent from applications 104. In these illustrative examples, request for information 131 is responsive to user input 132 from users 118. As depicted, request for information 131 may include user input 132. As also depicted, web page 130 includes research 134. Research 134 is information about a topic of interest. In the different illustrative examples, research 134 includes text, images, audio/video data, and other suitable types of information. As other examples, web page 130 may also be provided by search engine 122, messaging server 124, and email server 126 in response to receiving request for information 131.

Log 138 includes log of research 136, in these illustrative examples. Log of research 136 in log 138 comprises information browsed by users 118 using applications 104 in client device 102. In the different illustrative examples, log of research 136 in log 138 includes a copy of research 134 and any other suitable information recorded in client device 102 about information browsed by users 118 in response to user input 132.

As depicted, users 118 provide user input 140 to applications 104 in client device 102 while modifying documents. In different illustrative examples, user input 140 may correspond to research 134. For example, while using editor 108 to modify document 144, users 118 may enter information from research 134 into text 142 in document 144 via user input 140. As another example, when using messaging 110 to modify communication 148, users 118 may enter information from research 134 into text 146 in communication 148 via user input 140. As still another example, when using email 112 to modify email 152, users 118 may enter information from research 134 into text 150 in email 152 via user input 140. Information about research 134 entered into text 142, text 146, and text 150 may include a copy of research 134, a copy of a portion of research 134, a copy of a portion of research 134 that has been modified by a user, an example of research 134 created by a user, a summary of research 134 created by a user, and any suitable number of words corresponding to research 134 for describing at least a portion of research 134. "A number," as used herein with reference to an item, means one or more items.

In these illustrative examples, client device 102 is one or more computers. When client device 102 is more than one computer, client device 102 may take the form of a computer cluster, group of computer systems, or other configurations of client devices configured to run applications 104. Text management system 114 may be implemented using hardware, software, or a combination of the two. In these illustrative examples, text management system 114 is configured to manage text in applications 104 in client device 102.

In these illustrative examples, user interface for modifying text 116 may be used by text management system 114 to prompt users 118 to modify text 142, text 146, and text 150. For example, text management system 114 may prompt users 118 to modifying text 142 responsive to determining that a mismatch exists between a search result for text 142 and log of research 136.

The illustration of text management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional servers, in addition to web server 120, search engine 122, messaging server 124, and email server 126, may be used by text management environment 100. In this example, each of the additional servers may be used by text management system 110 in a process to manage text in documents modified by users 118 using applications 104 in client device 102.

As another example, while research 134 is shown in web page 130 in web browser 106, other applications may also be used to identify research 134. For example, users 118 may also use editor 108, messaging 110, email 112 and other suitable applications in client device 102 other than web browser 106 to identify research 134.

Figure 2:
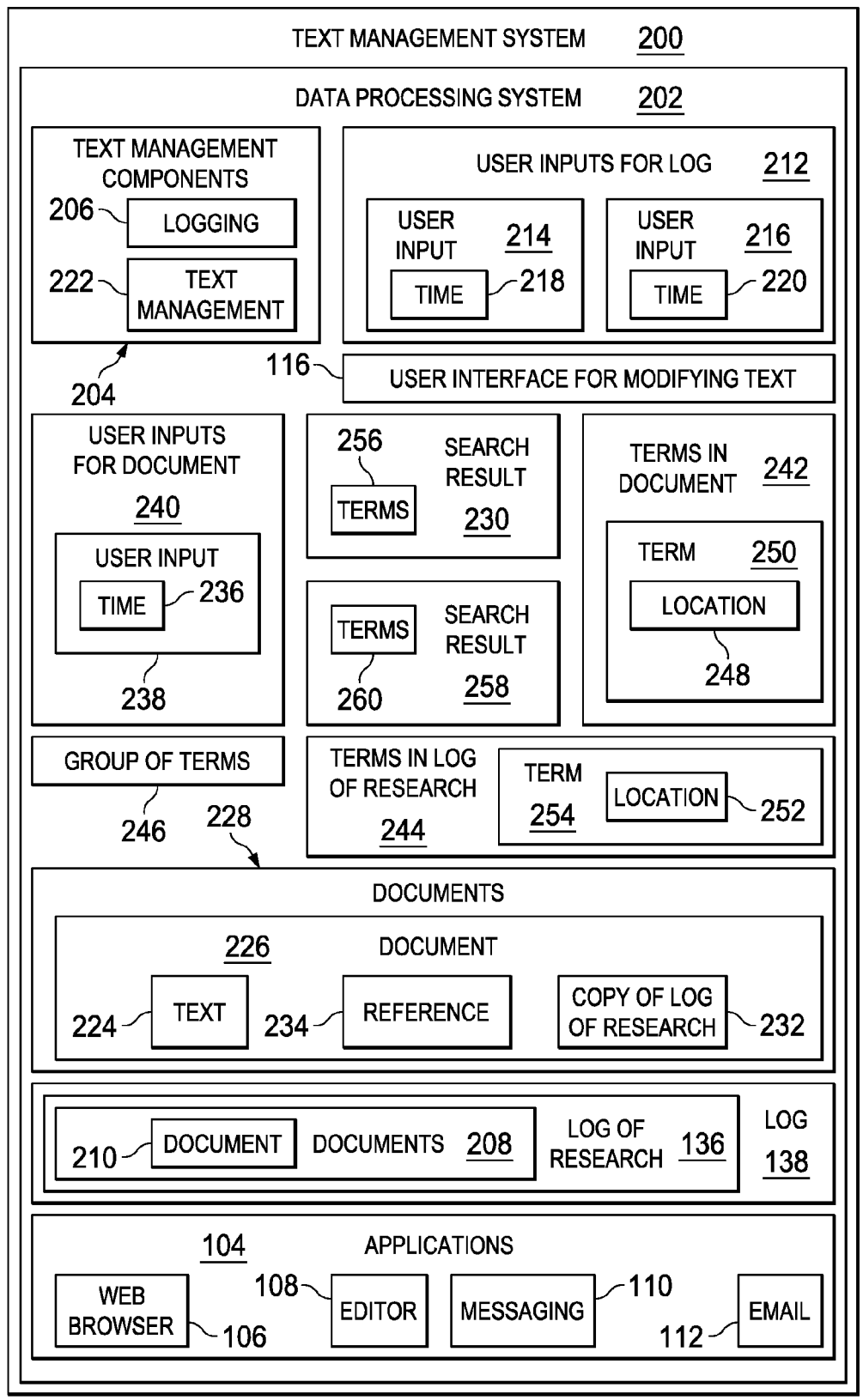
FIG. 2 is a block diagram of components involved in managing text in documents in a data processing system in accordance with an illustrative embodiment.

Turning next to FIG. 2, a block diagram of components involved in managing text in documents in a data processing system is depicted in accordance with an illustrative embodiment. Text management system 200 is an example of one implementation of text management system 114 in text management environment 100 in FIG. 1.

In this illustrative example, data processing system 202 is present in text management system 200. Data processing system 202 may be any combination of hardware components, software components, or a combination of the two implementing text management system 200. Data processing system 202 comprises text management components 204.

In these illustrative examples, text management components 204 comprise a number of components that manage text. Logging 206 is a component included in text management components 204 that records number of documents 208 in log of research 136 in log 138. Log of research 136 in log 138 in FIG. 2 is an example of log of research 136 in FIG. 1 in log 138 in FIG. 1. Logging 206 stores document 210 in number of documents 208 in response to number of user inputs for log 212. In these illustrative examples, user input 214 and user input 216 in number of user inputs for log 212 are examples of user input 132 in FIG. 1 corresponding to log of research 136. As depicted, number of user inputs for log 212 comprise a time when each user input occurs. For example, time 218 for user input 214 is the time when user input 214 occurred and time 220 for user input 216 is the time when user input 216 occurred. In these illustrative examples, document 210 is an example of web page 130 in FIG. 1.

Text management 222 is a component included in text management components 204 that manages text in documents. In these illustrative examples, text management 222 manages text 224 in document 226 in number of documents 228. Text 224 in document 226 is an example of text 142 in document 144 in FIG. 1, text 146 in communication 148 in FIG. 1, and text 150 in email 152 in FIG. 1.

In a process for managing text in number of documents 228 that do not match desired search results, text management 222 identifies whether log of research 136 matches text 224 in document 226. Text management 222 determines whether a mismatch exists between search result 230 for text 224 and log of research 136. Responsive to determining the mismatch exists between search result 230 for text 224 and log of research 136, text management 222 modifies text 224 based on log of research 136. In the different illustrative examples, text management 222 adds copy of log of research 232 to document 226 in response to a search result for text 224 matching log of research 136. Copy of log of research 232 is a copy of log of research 136. As depicted, text management 222 adds reference 234 to document 226. In these illustrative examples, reference 234 points to one or both of copy of log of research 233 in document 226 and log of research 136. As used herein, the term "reference" means a pointer to a resource.

In the different illustrated examples, copy of log of research 232 is added to document 226 for subsequent browsing when viewing text 224 in document 226. For example, subsequent to placing copy of log of research 232 and reference 234 pointing to copy of log of research 232 in document 226, text management 222 presents reference 234 to a user of document 226. In this example, subsequent to user input selecting reference 234 the user is presented copy of log of research 232.

In these illustrated examples, text management 222 determines whether log of research 136 matches text 224 in document 226 based on time 236 for user input 238 in number of user inputs for document 240 matching number of user inputs for log 212. User input 238 is an example of user input 140 in FIG. 1. In the different illustrative examples, time 236 matches number of user inputs for log 212 when a difference between time 236 and a time in number of user inputs for log 212 is within a threshold of time for identifying when the user input in log of research 136 is associated with user input 238.

In these illustrated examples, text management 222 also determines whether log of research 136 matches text 224 in document 226 based on number of terms in document 242 and number of terms in log of research 244. As depicted, text management 222 identifies number of terms in document 242 by parsing document 226. Text management 222 also identifies number of terms in log of research 244 by parsing number of documents 208. Text management 222 further identifies group of terms 246 based on terms in number of terms in document 242 that are also in number of terms in log of research 244. In the different illustrative examples, when group of terms 246 includes at least one term, log of research 136 is determined to match text 224 in document 226.

As depicted, location 248 of term 250 in number of terms in document 242 identifies text 224 in document 226. As also depicted, location 252 of term 254 in number of terms in log of research 244 identifies document 210 in number of documents 208 in log of research 136.

In the different illustrative examples, text management 222 determines whether a mismatch exists between search result 230 for text 224 and log of research 136 based on terms 256 in search result 230 not matching number of terms in log of research 244. Responsive to determining that the mismatch exists between search result 230 for text 224 and log of research 136, text management 222 modifies text 224 based on log of research 136 by modifying text 224 to include terms in number of terms in log of research 244. Subsequent to modifying text 224 to include terms in number of terms in log of research 244 text management 222 determines whether search result 258 for modified text 224 matches log of research 136 based on terms 260 in search result 258 matching number of terms in log of research 244. Text management 222 may continue to make modifications to text 224 until a search request for the modified text includes terms that match number of terms in log of research 244. As also depicted text management 222 may use user interface for modifying text 116 in FIG. 1 to present an option to users of applications 104 for modifying text 224 to improve search results for text 224 from search result 230 to search result 258.

The illustration of text management system 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional components, in addition to the components shown in text management system 200, may be present within text management system 200. For example, a database component may also be included in data processing system 202 for storing log 138.

In some illustrative examples, additional servers, in addition to web server 120, search engine 122, messaging server 124, and email server 126, may be used by text management system 200. In this example, each of the additional servers may be used by text management system 200 in a process to manage text in number of documents 228.

As another example, text management 222 may determine whether a match exists between text 224 in document 242 and log of research 244 based on a number of rules for comparing text 224 in document 242 with log of research 244. Text management 222 may also determine whether a mismatch exists between search result 230 for text 224 and log of research 136 based on a number of rules for comparing search result 230 with log of research 244. For example, a rule for comparing text may include identifying a match based on a number of words of a portion of a document matching a number of words of a portion of another document within a predefined threshold for a percentage of words matching between the portions of the documents. As another example, a rule for comparing text may include identifying a mismatch based on a number of words of a portion of a document not matching a number of words of a portion of another document within a predefined threshold for a percentage of words not matching between the portions of the documents. In these illustrative examples, the percentage of words in the rules for comparing text may be set by user input.

As used herein, the term "portion" with reference to a document means a number of terms in the document associated with each other based on a location of the words in the document. In the different examples, a portion of a document where terms are located that are associated with each other includes a sentence in the document, a paragraph in the document, a chapter in the document, a table in the document, a phrase in the document, a quotation in the document, an appendix in a document, and other suitable types of portions of a document. For example, a threshold for matching may include a predefined percentage for the number of terms matching for a particular type of portion of a document. For example, a rule may be to identify a match between sentences in documents when at least 70% of the terms in the two respective sentences of different documents match. In this example, a mismatch is identified when 70% of the terms in the respective sentences do not match.

Figure 3:
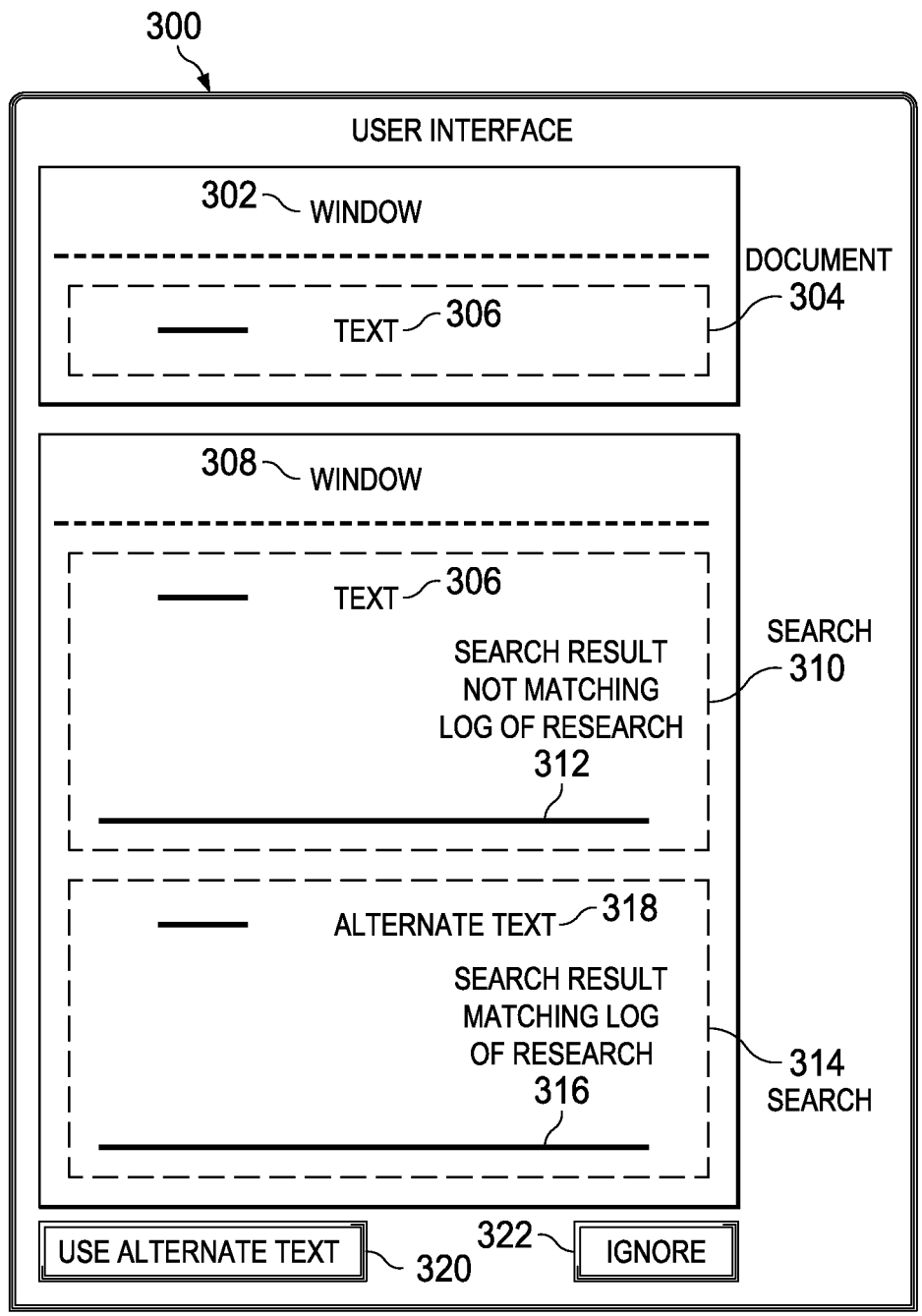
FIG. 3 is an illustration of a user interface for managing text in a document in accordance with an illustrative embodiment.

With reference now to FIG. 3, an illustration of a user interface for managing text in a document is depicted in accordance with an illustrative embodiment. User interface 300 is an illustrative example of one implementation of a graphical user interface for text management system 200 in FIG. 2 in data processing system 202 in FIG. 2. In other illustrative examples, user interface 300 may also be any type of user interface suitable for presenting the contents of user interface 300 to one or more users.

In this illustrative example, user interface 300 includes window 302 of applications 104 in FIG. 1. As depicted, window 302 is present in user interface 300 and includes text 306 in document 304. Text 306 in document 304 is an example of text 224 in document 226. As also depicted, window 308 is a window present in user interface 300 for showing an option for modifying text 306 in document 304. Search 310 in window 308 comprises search result not matching log of research 312 for text 306. In this illustrative example, a mismatch exists between search result not matching log of research 312 and a log of research. Search 314 in window 308 comprises search result matching log of research 316 for alternate text 318. In this illustrative example, search 310 is an example of search result 230 in FIG. 2. Alternate text 318 is an example of text 224 after modification of text 224 by text management 222 in FIG. 2 to include terms in number of terms in log of research 244 in FIG. 2. In this illustrative example, search 314 is an example of search result 258 in FIG. 2.

Use alternate text 320 is a button in window 308 to replace text 306 in document 304 with alternate text 318. Ignore 322 is a button in window 308 to ignore window 308 and leave text 306 in document 304 as is.

For example, text 306 in document 304 may read "the first step for changing the oil in your car is . . . ." When researching what the first step for changing the oil is, a person writing text 306 in document 304 may have browsed a particular web page that described the first step for a particular car. In this example, the browsing of the particular web page that described the first step for the particular car is recorded in a log of research. Because the first step for changing oil in a car may be different from one particular car to the next, it may be important to modify text 306 such that a search result for text 306 will include the particular web page for the particular car. For example, it may be desirable for a person that performs a search for more information about text 306 in document 304 to get a search result that includes the particular web page for the particular car that the person who wrote text 306 in document 304 browsed while researching text 306. In this example, because text 306 does not include the particular car, a search result for text 306 may return web pages that are not desired. More particularly, the search result for text 306 may not include the web page for the particular car the writer used while writing text 306. Still more particularly, when the search result for text 306 does not include the web page, the web page is identified as a mismatch between the search result for text 306 and the log of research. In this example, alternate text 318 may read "the first step for changing oil in a particular car is . . . " In this example, alternate text 318 now includes the particular car in the web page that the writer of text 306 browsed while researching text 306. In this example, because the particular car is included in alternate text 318, a search result for alternate text 318 may now include the particular web page for the first step for the particular car.

Turning next to FIG. 4, an illustrative example of a flowchart of a process for managing text in a document based on a log of research matching the text in the document is depicted in accordance with an illustrative embodiment. The steps in FIG. 4 may be implemented in text management system 200 in FIG. 2. In particular, the steps in the process may be implemented in software, hardware, or a combination of the two in text management components 204 in data processing system 202 in FIG. 2.

The process begins by identifying a log of research and text in a document that matches the log of research (step 400). In this illustrated process, the log of research is an example of log of research 136 in FIG. 2. The text in the document is an example of text 224 in document 226 in FIG. 2.

The process next determines whether a mismatch exists between a search result for the text and the log of research (step 402). In this illustrated process, the search result is an example of search result 230 in FIG. 2.

Then responsive to the process determining in step 404 that the mismatch exists between the search result and the log of research, the process modifies the text in the document based on the log of research (step 406) with the process terminating thereafter.

Figure 5:
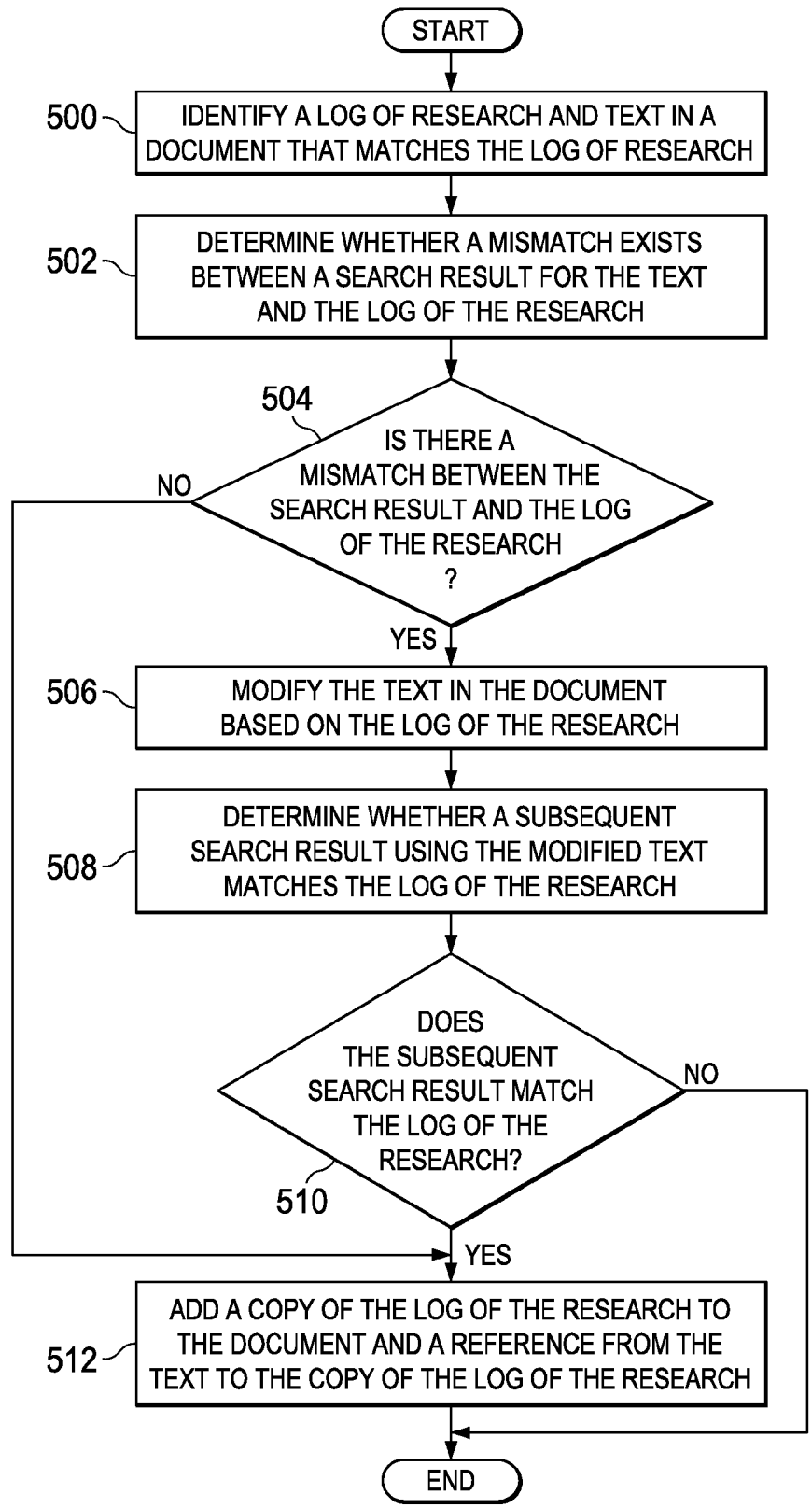
FIG. 5 is a flow chart of a process for managing text in a document based on a log of research matching the text in the document and adding a copy of the log of research matching the text in the document to the document in accordance with an illustrative embodiment.

Turning next to FIG. 5, an illustrative example of a flowchart of a process for managing text in a document based on a log of research matching the text in the document and adding a copy of the log of research matching the text in the document to the document is depicted in accordance with an illustrative embodiment. The steps in FIG. 5 may be implemented in text management system 200 in FIG. 2. In particular, the steps in the process may be implemented in software, hardware, or a combination of the two in text management components 204 in data processing system 202 in FIG. 2.

The process begins by identifying a log of research and text in a document that matches the log of research (step 500). In this illustrated process, the log of research is an example of log of research 136 in FIG. 2. The text in the document is an example of text 224 in document 226 in FIG. 2.

The process next determines whether a mismatch exists between a search result for the text and the log of research (step 502). In this illustrated process, the search result is an example of search result 230 in FIG. 2.

Responsive to the process determining in step 504 that the mismatch exists between the search result and the log of research, the process modifies the text in the document based on the log of research (step 506) and determines whether a subsequent search result using the modified text matches the log of research (step 508). As depicted by step 504 and step 510, when the process determines that either the search result or the subsequent search result matches the log of research, the process adds a copy of the log of research to the document and a reference from the text to the copy of the log of the research (step 512) with the process terminating thereafter.

Figure 6:
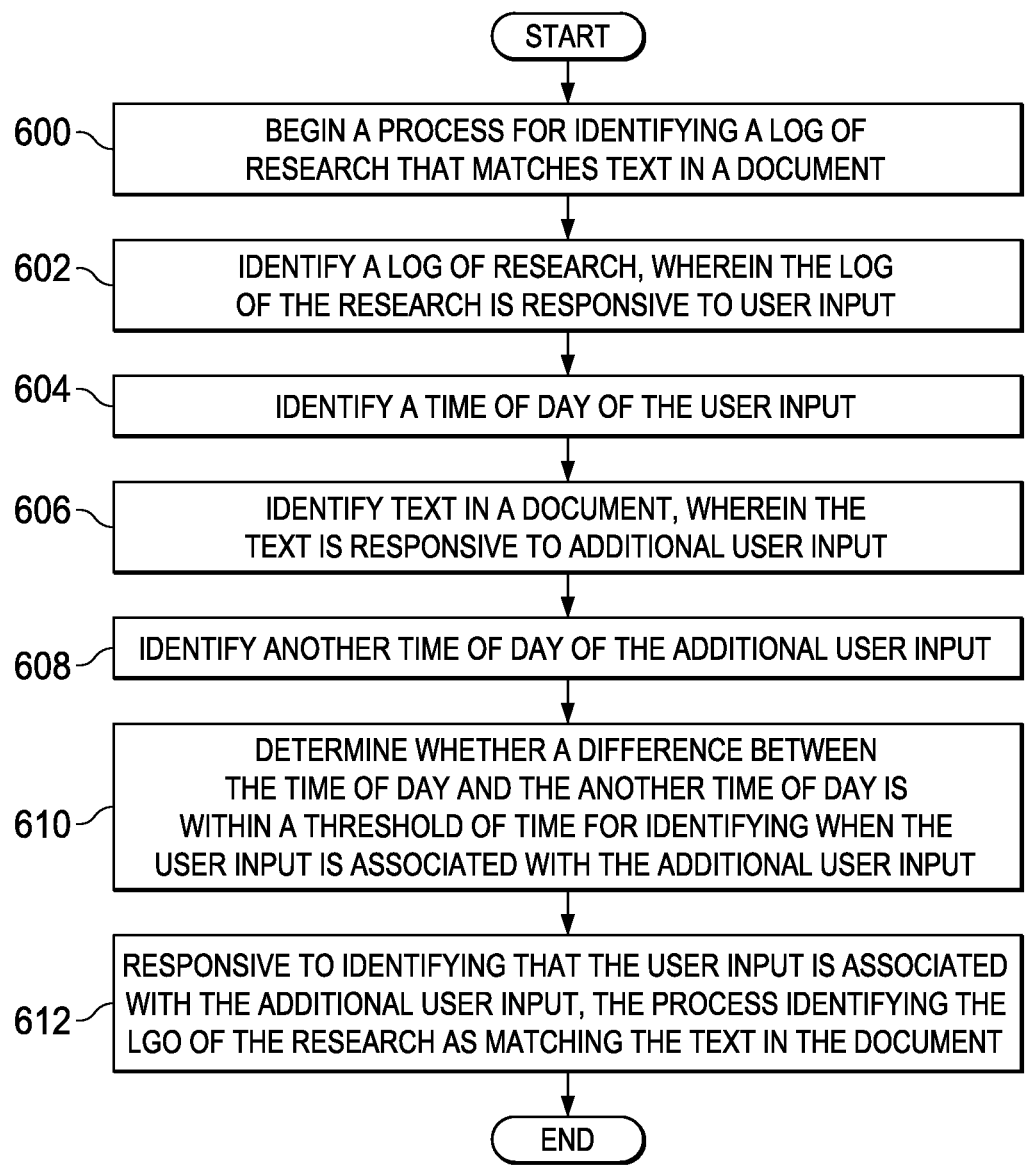
FIG. 6 is a flow chart of a process for identifying a log of research that matches text in a document in accordance with an illustrative embodiment.

Turning next to FIG. 6, an illustrative example of a flowchart of a process for identifying a log of research that matches text in a document is depicted in accordance with an illustrative embodiment. The steps in FIG. 6 may be implemented in text management system 200 in FIG. 2. In particular, the steps in the process may be implemented in software, hardware, or a combination of the two in text management components 204 in data processing system 202 in FIG. 2.

The process begins by identifying a log of research, wherein the log of the research is responsive to user input (step 602). In this illustrated process, the log of research is an example of log of research 136 in FIG. 2. The user input is an example of number of user inputs for log 212 in FIG. 2.

The process next identifies a time of day of the user input (step 604). In this illustrated process, the time of day of the user input is an example of time 218 and time 220 in FIG. 2. The process identifies text in a document, wherein the text is responsive to additional user input (step 606). The text in the document is an example of text 224 in document 226 in FIG. 2. The additional user input is an example of number of user inputs for document 240 in FIG. 2.

The process next identifies another time of day of the additional user input (step 608). In this illustrated process, the another time of day of the additional user input is an example of time 236 user input 238 in number of user inputs for document 240 in FIG. 2.

The process determines whether a difference between the time of day and the another time of day is within a threshold of time for identifying when the user input is associated with the additional user input (step 610). Then, responsive to identifying that the user input is associated with the additional user input, the process identifies the log of research as matching the text in the document (step 612) with the process terminating thereafter.

Turning next to FIG. 7, an illustrative example of a flowchart of a process for identifying text in a document matching a log of research based on a group of terms located in both the document and the log of the research is depicted in accordance with an illustrative embodiment. The steps in FIG. 7 may be implemented in text management system 200 in FIG. 2. In particular, the steps in the process may be implemented in software, hardware, or a combination of the two in text management components 204 in data processing system 202 in FIG. 2.

The process begins by identifying a first number of terms in a document (step 700). In this illustrated process, the first number of terms in the document is an example of number of terms in document 242 for document 226 in FIG. 2. The process next identifies a second number of terms in a log of research (step 702). In this illustrated process, the second number of terms in the log of research is an example of number of terms in log of research 244 in FIG. 2 for log of research 136 in FIG. 2. The process identifies a group of terms in the first number of terms that are also in the second number of terms (step 704). In this illustrated process, the group of terms is an example of group of terms 246 in FIG. 2.

The process next identifies the portion of the document that includes the group of terms as text that matches the log of the research (step 706) with the process terminating thereafter.

Figure 8:
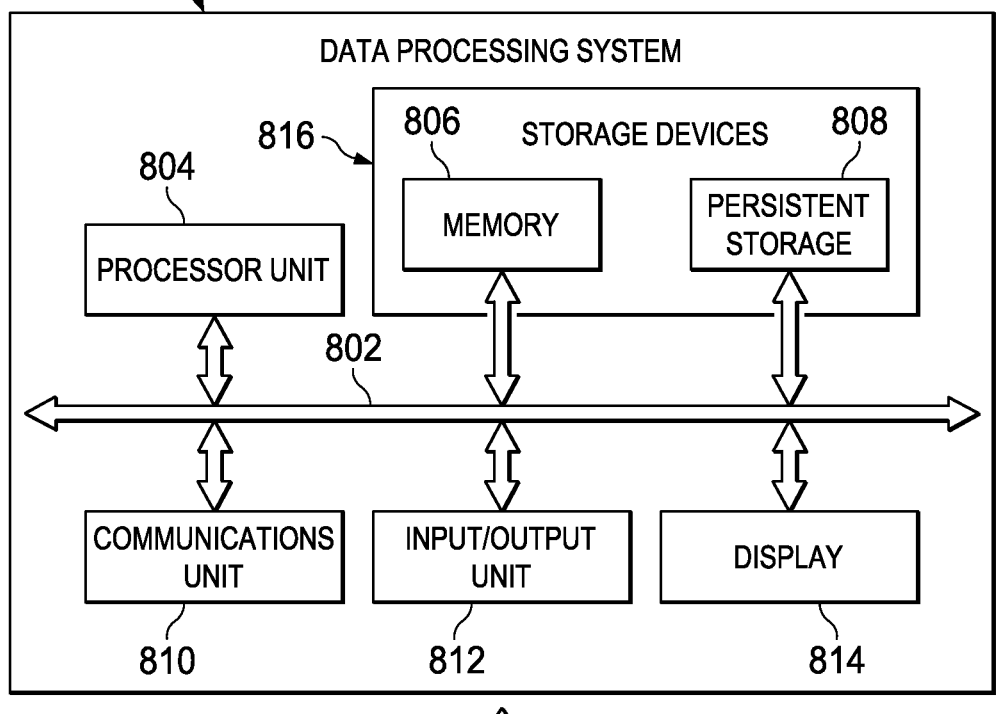
FIG. 8 is an illustration of a data processing system in accordance with an illustrative embodiment.

Turning now to FIG. 8, an illustration of a data processing system is depicted in accordance with an illustrative embodiment. In this illustrative example, data processing system 800 includes communications fabric 802, which provides communications between processor unit 804, memory 806, persistent storage 808, communications unit 810, input/output (I/O) unit 812, and display 814. Data processing system 800 is an example of a data processing system that may be used to manage text in a text management system. Data processing system 800 is also an example of a data processing system that may be used to implement text management system 110 in FIG. 1, client device 102 in FIG. 1, web server 120 FIG. 1, search engine 122 FIG. 1, messaging server 124 FIG. 1, and email server 126 in FIG. 1. More particularly, data processing system 800 may be used to implement data processing system 202 in FIG. 2.

Processor unit 804 serves to process instructions for software that may be loaded into memory 806. Processor unit 804 may be a number of processors, a multi-processor core, or some other type of processor, depending on the particular implementation. "A number," as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for processing by processor unit 804. The processes of the different embodiments may be performed by processor unit 804 using computer-implemented instructions, which may be located in a memory, such as memory 806.

These instructions are referred to as program code, computer usable program code, or computer readable program code that may be read and processed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for processing by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800.

In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, a remote data processing system, or some other device capable of storing and transmitting program code 818. For example, program code stored in the computer readable storage medium in data processing system 800 may be downloaded over a network from the remote data processing system to the computer readable storage medium in data processing system 800. Additionally, program code stored in the computer readable storage medium in the server computer may be downloaded over the network from the server computer to a computer readable storage medium in the remote data processing system.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or transmit and receive data. Communications unit 810 may be, for example, a modem or a network adapter, two network adapters, or some combination thereof. Further, a memory may be, for example, memory 806, or a cache, such as found in an interface and memory controller hub that may be present in communications fabric 802.

Thus, the illustrative embodiments provide a method, apparatus, and computer program product for managing text. The invention solves the problem of managing text of documents that do not match desired search results, by providing a text management system. The text management system identifies a log of research and text in a document that matches the log of research. The text management system determines whether a mismatch exists between a search result for the text in the document and the log of research. Responsive to determining the mismatch exists between the search result for the text and the log of research, the text management system then modifies the text in the document based on the log of research. The text management system also adds a copy of the log of research to the document. The text management system further adds to the document a reference from the text in the document to one or both of the copy of the log of research in the document and the log of research.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing text by a data processing system comprising a processor unit and memory, the method comprising:
   identifying, by the data processing system, a log of research and a text in a document that matches the log of research; and
   responsive to the data processing system determining a mismatch between a search result for the text and the log of research, the data processing system modifying the text in the document based on the log of research.

2. The method of claim 1, wherein responsive to the data processing system modifying the text, a subsequent search result for the text matches the log of research.

3. The method of claim 2, wherein the log of research includes a number of documents browsed on a computing device.

4. The method of claim 3 wherein the number of documents includes a web page, the search result and the subsequent search result are retrieved from a web based search engine, and wherein the data processing system determining the mismatch between the search result and the log of research comprises:
   the data processing system determining whether the web page in the number of documents in the log of research is located in the search result for the text retrieved from the web based search engine; and
   responsive to the data processing system determining that the web page is not located in the search result, the data processing system identifying the web page that is not in the search result as the mismatch between the search result and the log of research.

5. The method of claim 1, wherein identifying, by the data processing system, the log of research and the text in the document that matches the log of research comprises:
   identifying a first number of terms in the document and a second number of terms in the log of research; and
   identifying a group of terms in the first number of terms that are also in the second number of terms, wherein locations for each of the group of terms in the log of research identify the log of research matching the text in the document, and wherein other locations for each of the group of terms in the document identify the text in the document.

6. The method of claim 1, further comprising:
   adding, by the data processing system, a copy of the log of research to the document.

7. The method of claim 6, further comprising:
   adding, by the data processing system, a reference from the text to the copy of the log of research in the document.

8. The method of claim 1, further comprising:
   adding, by the data processing system, a reference from the text to the log of research.

9. The method of claim 1 wherein the log of research is responsive to user input, and wherein the text in the document is responsive to additional user input.

10. The method of claim 9, wherein identifying, by the data processing system, the log of research and the text in the document matching the log of research includes:
   identifying a time of day of the user input and another time of day of the additional user input; and
   determining whether a difference between the time of day and the another time of day is within a threshold of time for identifying when the user input is associated with the additional user input.

11. The method of claim 9 wherein the user input is to a number of applications, and wherein the additional user input is to another application.

12. The method of claim 1, wherein the document is one of an email and a text message.

13. The method of claim 1, wherein the log of research comprises information browsed by a user in response to user input.

14. The method of claim 1, wherein the log of research comprises search results returned by a search engine in response to user input.

15. An apparatus for managing text, the apparatus comprising:
   a processor unit, a memory, and a computer readable storage device;
   first program instructions to identify a log of research and a text in a document that matches the log of research; and
   second program instructions to determine a mismatch exists between a search result for the text and the log of research, and if so, modify the text in the document based on the log of research, wherein the first program instructions and the second program instructions are stored in the computer readable storage device for execution by the processor unit via the memory.

16. The apparatus of claim 15, wherein responsive to the modification of the text a subsequent search result for the text matches the log of research.

17. The apparatus of claim 15, wherein the first program instructions to identify the log of research and the text in the document that matches the log of research comprises:
   program instructions to identify a first number of terms in the document and a second number of terms in the log of research; and
   program instructions to identify a group of terms in the first number of terms that are also in the second number of terms, wherein locations for each of the group of terms in the log of research identify the log of research matching the text in the document, and wherein other locations for each of the group of terms in the document identify the text in the document.

18. The apparatus of claim 15, further comprising:
   third program instructions to add a copy of the log of research to the document, wherein the third program instructions are stored in the computer readable storage device for execution by the processor unit via the memory.

19. The apparatus of claim 15, wherein the log of research comprises information browsed by a user in response to user input.

20. The apparatus of claim 15, wherein the log of research comprises search results returned by a search engine in response to user input.

21. A computer program product for managing text, the computer program product comprising a non-transitory computer readable storage device having program instructions embodied therewith, the program instructions executable by a data processing system to cause the data processing system to perform steps of:
   identifying a log of research and a text in a document that matches the log of research; and determining whether a mismatch exists between a search result for the text and the log of research, and if so, modifying the text in the document based on the log of research.

22. The computer program product of claim 21, wherein the program instructions comprises a plurality of programs and wherein one program of the plurality of programs causes another program to be downloaded to the data processing system while managing the text.

23. The computer program product of claim 21, wherein the program instructions are downloaded over a network from a remote data processing system to the computer readable storage device.

24. The computer program product of claim 23, wherein the computer readable storage device is a first computer readable storage device in a server data processing system, and wherein the program instructions are downloaded over the network to the remote data processing system for use in a second computer readable storage device in the remote data processing system.

25. The computer program product of claim 21, wherein the log of research comprises information browsed by a user in response to user input.

26. The computer program product of claim 21, wherein the log of research comprises search results returned by a search engine in response to user input.

* * * * *